United States Patent [19]
Gazuit

[11] 3,794,457
[45] Feb. 26, 1974

[54] TIRE CURING PRESS TIRE BEAD POSITIONING DEVICE

[76] Inventor: Georges Gazuit, Chemin, Chauneau, 03, Montlucon, France

[22] Filed: Dec. 29, 1972

[21] Appl. No.: 319,915

[30] Foreign Application Priority Data
Jan. 3, 1972   France ................................ 72.0021

[52] U.S. Cl. .................... 425/28 R, 425/23, 425/36, 425/38, 425/58, 144/288 A
[51] Int. Cl. .............................................. B29h 5/02
[58] Field of Search ....... 425/11, 12, 13, 14, 15, 16, 425/17, 18, 19, 20, 21, 22, 23, 24, 25, 26, 27, 28, 29, 30, 31, 32, 33, 35, 36, 37, 38, 39, 43, 46, 47, 58; 144/288 A; 18/2 T, 4 S

[56] References Cited
UNITED STATES PATENTS

| | | | |
|---|---|---|---|
| 2,337,857 | 12/1943 | Soderquist | 425/33 |
| 2,854,693 | 10/1958 | Robbins | 425/23 |
| 2,979,091 | 4/1961 | Noall | 144/288 A |
| 3,579,736 | 5/1971 | Balle et al. | 425/38 |
| 3,385,686 | 6/1971 | Balle | 425/23 X |

*Primary Examiner*—J. Howard Flint, Jr.
*Attorney, Agent, or Firm*—Amster & Rothstein

[57] ABSTRACT

In a tire curing press comprising a mold including several component elements, said mold comprising as one of its component elements a lower flange provided with a centering ring, and a well extending coaxially downwards from said centering ring, a device for positioning the lower bead of a horizontally disposed crude tire around the centering ring of the lower mould member, said device being housed in said well and comprising a tubular member slidably disposed coaxially in said well and centering ring, said tubular member having a cavity formed in the outer peripheral wall thereof at the upper end of said tubular member, means for axially moving at will said tubular member up- and downwards in said well, and an inflatable bladder entirely housed in said cavity and adapted, when inflated, to project radially outwards from said cavity.

5 Claims, 5 Drawing Figures

3,794,457

TIRE CURING PRESS TIRE BEAD POSITIONING DEVICE

BACKGROUND OF THE INVENTION.

The present invention relates in general to tire curing presses of the type comprising a mould made of several elements and having as one of the elements thereof a lower flange which incorporates a ring for centering the lower bead of a crude tire to be vulcanized, the present invention being concerned more particularly with means intended for facilitating the proper positioning of said lower bead of the crude tire around said centering ring.

It is known that in curing presses the crude tire to be vulcanized is disposed horizontally in the press mold so that one can distinguish an upper bead and a lower bead of the tire. Now in most tire curing presses no means are provided for properly centering the lower bead of the crude tire with respect to the lower flange of the press mould before introducing a bladder or cylindrical vulcanizing diaphragm into the crude tire. As a result, there is a great likelihood of fitting the tire in a wrong position into the mould and therefore of producing a mis-shaped tire.

However, in certain known presses comprising a special loading device for introducing the crude tire to be vulcanized into the mould of the curing press, the lower bead of the tire is centered automatically around the centering ring of the lower mould flange by said loading device as the latter lowers the crude tire for laying same upon the lower mould flange. This arrangement, though quite satisfactory from the strict point of view of the proper centering of the lower bead, requires compulsorily the presence of a loading device or similar equipment on the curing press. Moreover, this loading device, when removed after the crude tire has been laid upon the lower flange of the mould, releases the lower bead without inasmuch ensuring a proper centering of the upper bead. This upper bead is seized and centered in the upper mould flange only afterwards, by means of a controlled centering device associated with said upper flange. As far a tire curing presses are concerned the present trend is towards the use of the upper portion of the mould in conjunction with the controlled centering device associated therewith (intended for centering the upper bead) for seizing and thereafter loading a crude tire directly upon the lower flange of the mould, said upper mould portion and said device, as already known per se, having in addition to the usual up- and downward movements above the lower mould flange the possibility of travelling by translation as a unit in a lateral direction in relation to the lower flange. Under these conditions, it is possible to dispense with a special loading device, but then the problem to be solved consists in centering the lower bead of the crude tire as the latter is being positioned on the lower mould flange. From the onset, it seems difficult if not impossible to associate with the lower flange of the mould a controlled centering device similar to those which are usually associated with the upper mould flange for centering the upper tire bead. In fact, these controlled centering devices for centering the upper bead consist as a rule of radially movable segments which can be moved in both radial directions by control means so that, if such a device were associated with the lower flange, it would occupy most of the space normally reserved for the bladder in the well provided in the press centrally of the lower flange, or at least it would interfere with the expansion of this bladder inside the crude tire and also with the return of said bladder into the press well.

SUMMARY OF THE INVENTION.

It is the primary object of the present invention to avoid this inconvenience by providing a simple yet efficient device for positioning the lower bead of a crude tire around the bead centering ring incorporated in the lower flange of the mould of a tire curing press, without producing any interference with the subsequent movements of the vulcanizing bladder contemplated in the curing press.

To this end, the device according to this invention is adapted to be housed in the press well, and this device is characterized in that it comprises a tubular member which, when the device is mounted in the well of the tire curing press, is disposed coaxially with a moderate radial clearance within said well and said centering ring, and is vertically movable in said well; by means for producing at will the axial movements of said tubular member, up- and downwards, in said well, and also an inflatable bladder entirely housed in a cavity formed in the peripheral wall of said tubular member, at the upper end thereof, and which, when inflated, projects radially outwards from said cavity.

BRIEF DESCRIPTION OF THE DRAWINGS.

A clearer understanding of this invention may be had from the following detailed description of a typical embodiment of the invention which is shown by way of illustration in the accompanying drawings, in which.

DESCRIPTION OF THE PREFERRED EMBODIMENT.

Figure 1:
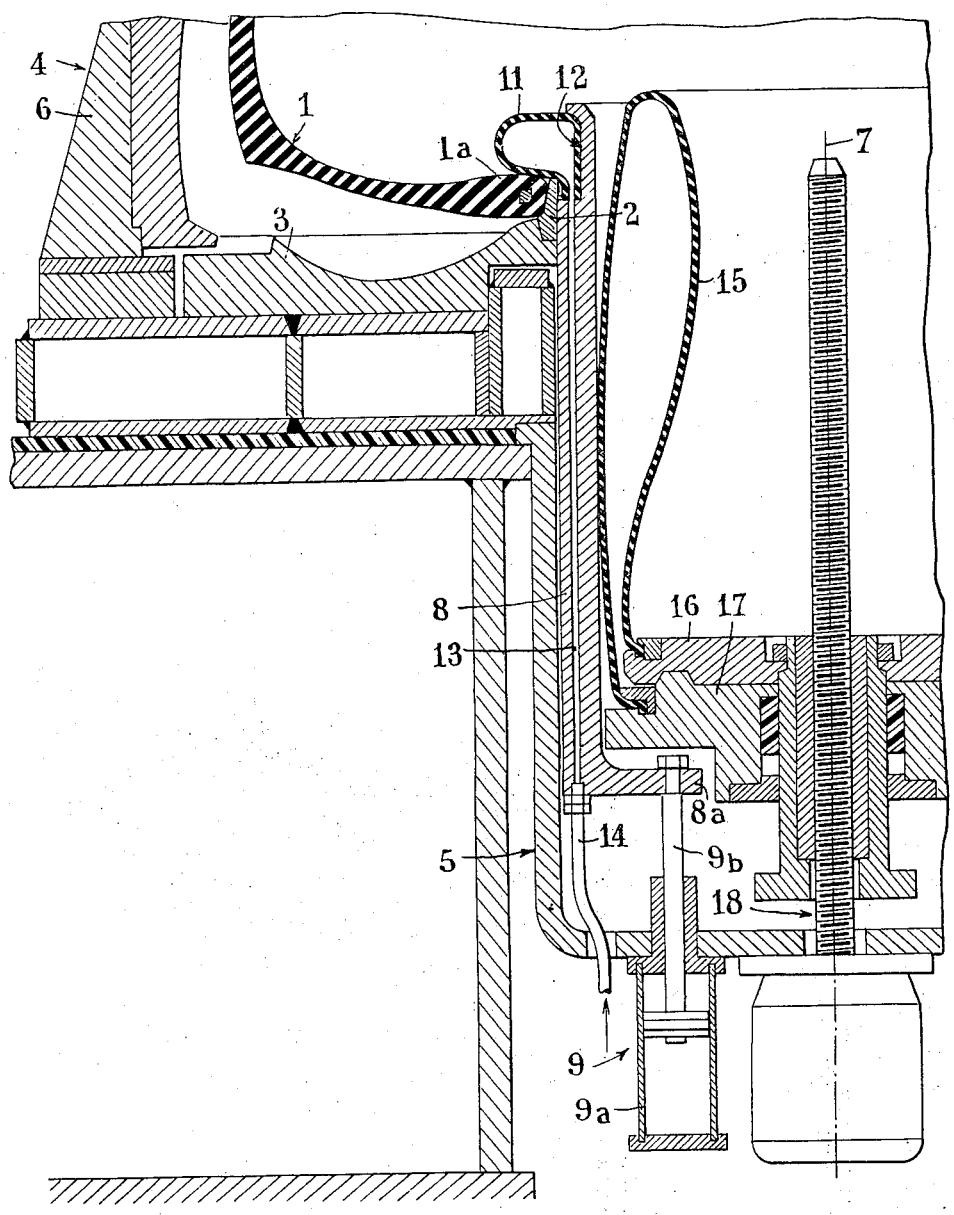
FIG. 1 is a half vertical section showing a device for positioning and centering the lower bead of a crude tire around a bead centering ring incorporated in the lower flange of the mould of a tire curing press.

The device illustrated in FIG. 1, intended for positioning the lower bead 1a of a crude tire 1 around the centering ring 2 incorporated in the lower flange 3 of the mould 4 of a tire vulcanizing press is housed in the well 5 of said press which is concentric to, and underlies, said centering ring 2. Only the press component elements strictly necessary for a proper understanding of this invention are shown in the drawings. Moreover, except for the lateral segments 6 of the mould, the press component elements described in the above preamble as well as the positioning and centering device of this invention are of revolution about the vertical axis 7 of the press well 5.

The positioning and centering device according to the present invention comprises essentially a tubular member 8 disposed coaxially, with a moderate radial clearance, within the well 5 and the centering ring 2 so as to be vertically slidable therein, means 9 for producing at will vertical up- and downward movements of the tubular member 8 in said well 5, and an inflatable bladder 11 entirely housed in a cavity 12 formed in the outer peripheral wall of the tubular member 8, at the upper end thereof, said bladder, when inflated, projecting radially outwards from said cavity.

In a preferred form of embodiment of the present invention said cavity 12 consists of an annular groove formed in the outer peripheral surface of tubular member 8. Under these conditions, the bladder 12 is also of annular configuration. However, in a modified form of embodiment, instead of providing an annular groove, a plurality of cavities disposed at spaced intervals along the circumference of tubular member 8 may be provided, with an inflatable bladder in each one of said cavities.

Figure 2:
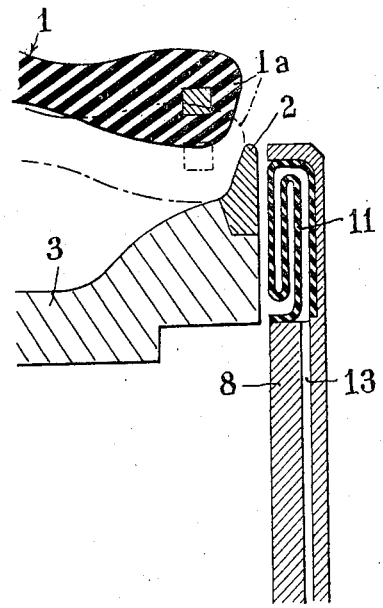
FIGS. 2 to 5 inclusive are fragmentary views on a larger scale showing the positioning and centering device of FIG. 1 in the various positions assumed sequentially by this device during its operation.
Figure 3:
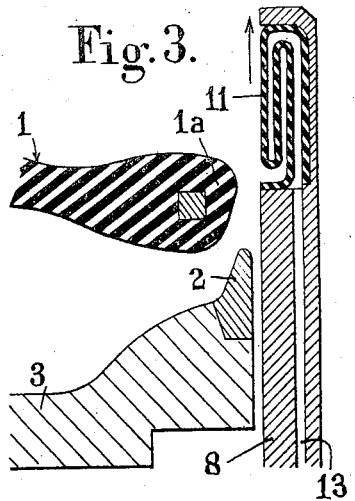
Figure 5:
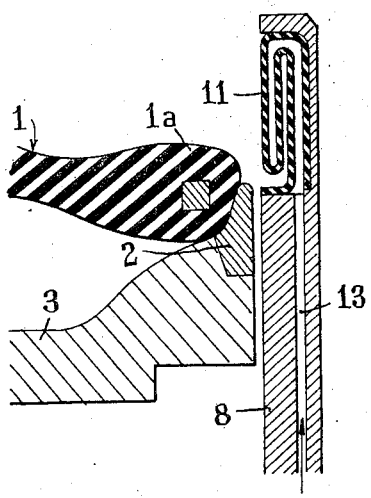

On the other hand, the bladder 11 is preferably pre-shaped, for example by moulding, so that, when deflated (see FIG. 2, 3 and 5) and seen in cross-sectional view, it is folded double or collapsed on itself in the cavity, and can resume always this collapsed condition when deflated.

Compressed air or any other suitable fluid under pressure is fed to said bladder 11 through at least one passage or hole 13 formed longitudinally through the wall of the tubular member 8 and opening into the bladder 11, and through a flexible hose 14 having one end connected to a source of fluid under pressure (not shown) via a solenoid-operated valve (slso not shown) which may be electrically connected in turn to a programming unit of a type usually associated with the press.

The control means 9 comprise a plurality of hydraulic or pneumatic rams (of which only one is shown in FIG. 1) connected to a source of fluid under pressure (not shown), the cylinder 9a of each ram being secured to the bottom of the press well 5, the piston-rod 9b of said ram being connected to a flange 8a rigid with the tubular member 8 and projecting radially inside this member.

Figure 4:
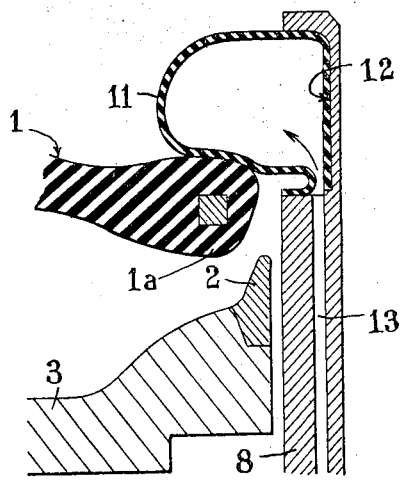

Now the mode of operation of the above-described device for positioning and centering the lower bead of a crude tire in the mould of a tire curing press will be explained. The tubular member 8 and bladder 11 being initially in the position shown in FIG. 2, after the crude tire 1 has been brought horizontally to a position in which it overlies the lower flange 3 of the mould and such that the lower bead 1a of the crude tire to be vulcanized is about one inch above the centering ring 2 (these preliminary operations, consisting in seizing the tire and bringing same to this position above the lower flange 3, being accomplished for example by using a loading device or directly by means of the upper portion of the mould and of the controlled centering device associated therewith for centering the upper bead of the tire), the tubular member 8 is then lifted by operating the control rams 8 and brought to the position shown in FIG. 3. Then, compressed air is supplied to the bladder 11 and the latter is thus inflated so as to project radially outwards from the cavity 12 and to overlie the lower bead 1a of the crude tire to be vulcanized (see FIG. 4). Then, the control rams 9 are actuated in the opposite direction to lower the assembly comprising the tubular member 8, bladder 11 and lower bead 1a until this assembly reaches the position shown in FIG. 1 where the lower bead 1a is properly positioned around the centering ring 2. Then, it is only necessary to raise the tubular member 8 to the position shown in FIG. 3, to deflate the bladder 11 which, as a consequence of the pre-shaping operation previously applied thereto, resumes automatically its initial shape during this deflating operation, and finally to lower the tubular member 8 to the position shown in FIG. 2, with the bead 1a in the position shown in dash and dot lines in this FIG. 2.

As will be readily seen from the above disclosure, the positioning and centering device described hereinabove is particularly simple and efficient. Moreover, it permits of easily housing within the tubular member 8 a vulcanizing bladder 15 with its flanges 16 and 17 and the control means 18 associated thereto. Furthermore, the vulcanizing bladder may be introduced into the crude tire without any difficulty and without any interference with the positioning and centering device of this invention, after the lower bead 1a of crude tire 1 has been positioned by this device around the centering ring 2 and after the tubular member 8 has been restored to the position illustrated in FIG. 2. A detailed description of the aforesaid component elements 15, 16, 17 and 18 and the manner in which the bladder 15 may be introduced into the tire 1 may be found in the U.S. Pat. application Ser. No. 293,089.

To sum up, the device of this invention constitutes a simple solution to the problem of centering the lower bead of a crude tire to be vulcanized and, since this device is connected to the frame structure of the tire curing press, it has the complementary advantage of ensuring that when the crude tire is seized and brought above the lower flange of the mould by means of the upper portion of the mould and of the controlled centering device associated therewith for centering the upper bead of the tire, the positioning of one bead of this tire cannot affect the position of the other bead since both beads are held simultaneously.

Of course, the above-described embodiment of the invention is given by way of example, not of limitation; therefore, many modifications and variations may be brought thereto without departing from the basic principles of the invention as set forth in the appended claims.

Thus, notably, although the positioning and centering device of this invention is intended and applicable more particularly for centering the lower bead of a crude tire around the centering ring associated with the lower flange of the mould, it could as well be associated with the upper flange of the mould for centering and positioning similarly the upper bead of the tire around the centering ring carried by the upper flange of the mould.

What I claim is:

1. In a tire curing press comprising a mould including several component elements, said mould comprising as one of its component elements a lower flange provided with a centering ring, and a well extending coaxially downwards from said centering ring, a device for positioning the lower bead of a horizontally disposed crude tire around the centering ring of the lower flange, said device being housed in said well and comprising a tubular member slidably disposed coaxially in said well and centering ring, said tubular member having a cavity formed in the outer peripheral wall thereof at the upper end of said tubular member, means for axially moving at will said tubular member up- and downwards in said well, and an inflatable bladder entirely housed in said cavity and adapted, when inflated, to project radially outwards from said cavity.

2. Device as set forth in claim 1, wherein said bladder is so pre-shaped that, when deflated and seen in section, it is folded double in said cavity and adapted, after its deflation, to constantly resume this folded shape.

3. Device as set forth in claim 1, wherein said cavity consists of an annular groove formed in the outer periphery of said tubular member, and said bladder has likewise an annular configuration.

4. Device as set forth in claim 1, wherein a plurality of cavities are disposed at spaced intervals along the circumference of said tubular member, each cavity receiving an inflatable bladder.

5. A tire curing press, comprising a mould made of several component elements including a lower flange provided with a ring for centering the lower bead of a crude tire to be vulcanized, central well concentric to and underlying said centering ring, and means for positioning the lower bead of the crude tire to be vulcanized around said centering ring, said means comprising a tubular member slidably disposed coaxially in said well and centering ring, said tubular member having a cavity formed in the outer peripheral wall thereof at the upper end of said tubular member, means for axially moving at will said tubular member up- and downwards in said well, and an inflatable bladder entirely housed in said cavity, said bladder being adapted, when inflated, to project radially outwards from said cavity.

* * * * *